United States Patent [19]

Goff

[11] 4,319,041

[45] Mar. 9, 1982

[54] METHOD OF PRODUCING HUMIC ACID

[76] Inventor: David W. Goff, 872 Bettino Ct., #412, Houston, Tex. 77024

[21] Appl. No.: 188,360

[22] Filed: Sep. 18, 1980

[51] Int. Cl.³ .............................................. C07C 65/04
[52] U.S. Cl. .................................................... 562/475
[58] Field of Search ......................................... 562/475

[56] References Cited

U.S. PATENT DOCUMENTS 2,992,093  7/1961  Burdick ................. 562/475
3,325,537  6/1967  Beasley et al. ................. 562/475

*Primary Examiner*—Paul J. Killos
*Attorney, Agent, or Firm*—Gunn, Lee & Jackson

[57] ABSTRACT

A liquid humic acid concentrate and a process for making the same is disclosed in which the humic acid is formed by mixing a humic acid bearing ore in a quantity of water and caustic soda for a specified period of time and continuing to mix to form a liquid product of humic acid.

6 Claims, No Drawings

METHOD OF PRODUCING HUMIC ACID

BACKGROUND OF THE DISCLOSURE

This invention relates to concentrated humic acid which is formed from a humic acid bearing ore, and to the process of producing the humic acid.

Soil humus is known as an important soil constituent for enhancing growth in plants. However, the humus content of many soils is inadequate and, in those cases, it is desirable to increase the humus content of the soil by treating it with various organic matter. It has been found that humic acids also increase the efficiency of soil applied fertilizers. This is accomplished through the high cation exchange capacity of humus which is in the range of 200 to 500 meg per 100 grams at pH 7. This is in comparison to soils which have cation exchange capacities that usually range from 8 to 45 meg per 100 grams at pH 7. A decreased cation exchange capacity is undesirable because it has the capacity to tie up fertilizer and keep it from being utilized by the plant. It is thus readily apparent that humus with its relatively high cation exchange capacity increases the efficiency of fertilizer.

One approach to improving the humus content of the soil has been to extract humus acid from humus acid bearing minerals and then apply the extracted humus acid in a concentrated form to the soil. One example of this approach is disclosed in U.S. Pat. No. 3,111,404 and U.S. Pat. No. 3,544,296, issued to John C. Karcher. These patents relate to the treatment of humic acid bearing ores, such as leonardite, to form a granular ammonia humate fertilizer. However, in these patents, the complexity of the process to form the humic acid concentrate is such that the end product formed is relatively expensive and the process itself employes expensive and complex machinery. Also, the end product in the Karcher patents is granular and not a concentrated liquid, which form would facilitate storage, shipment and handling in actual use, such as by permitting direct application of the humic acid to the soil through an irrigation system or by crop dusting. Also, in the Karcher process, other elements which might benefit plant life, such as metallic trace elements are removed because mechanical separation is employed to separate undissolved leonardite constituents.

In Karcher, phosphoric acid is first added during the process to convert the metallic salts of humic acid to humic acid, then ammonia is later added to form ammonium humate, which is then filtered to separate it from the solids present. The ammonium humate liquid is then dried to form a solid ammonium humate, and to reduce the pH of the product to 7. This drying procedure is time consuming, requires significant power and requires additional equipmemt to accomplish it. Also, during the Karcher process, the pH may be so low that constituents that may be beneficial to plant life may be lost.

Another process for extracting humic acid from a humic acid bearing ore is disclosed by U.S. Pat. No. 3,770,411 to James C. Chambers, et al. In that patent, the process requires the addition of ammonia and phosphoric acid in a first and second mixture, respectively. In U.S. Pat. No. 3,398,186 to Nelson N. Schwartz, et al, a process of extracting humic acid is disclosed wherein an aqueous solution of a sulfate salt selected from the group consisting of sodium sulfate, potassium sulfate and ammonium sulfate is used as the extracting solution. Schwartz, et al discloses that a caustic soda extracting solution may be used wherein the mixture is heated under reflux conditions for 24 hours and thereafter the solution is cooled and acidified resulting in a dark precipitate of humic acid. Similarly, in U.S. Pat. No. 3,076,291 to Frank Gardner, ammonium hydroxide, potassium hydroxide or sodium hydroxide may be used in a method for making a seed germination promoter. In U.S. Pat. No. 3,222,160 to Yves Ramus, a process for manufacturing a humic fertilizer is disclosed wherein a cellulosic containing material is impregnated with a solution of nitric acid which, in turn, is reacted with a compound selected from the group consisting of ammonia, potash and lime.

SUMMARY OF THE INVENTION

The present invention is a simple and inexpensive process for forming humic acid from readily available humic acid bearing ores. The process of the invention comprises the steps of placing a quantity of water in a mixing tank, adding a quantity of caustic soda and mixing for a short period of time, and adding a quantity of humic acid bearing ore and continuing to mix the mixture for a period of time to completely dissolve the mixture to form the humic acid extract.

One important feature of this invention is to provide humic acid in a concentrated liquid form.

Another object of this invention is to provide a process wherein the pH level is sufficiently neutral so that the constituents of the earth ore are not subjected to strong acids which may cause some of the constituents of the earth ore to be lost from the end product. This is accomplished by monitoring the pH level of the mixture and maintaining it at pH 7 by the addition of water when necessary.

It is another object of this invention to provide a process wherein concentrated humic acid is formed at ambient temperatures without adding ammonia or ammonium hydroxide.

DETAILED DESCRIPTION OF THE PREFERRED EMBODIMENT

The above objects, advantages and features of the invention are accomplished according to the preferred embodiment of this invention by mixing humic acid bearing ore such as leonardite with water and caustic soda to form a mixture and agitating this mixture to substantially dissolve the ore. The mixture can be made in any type of vessel and the agitation can be provided by any suitable means, it not being necessary to provide special equipment for this purpose. However, it is preferred that a large mixing tank be used having the capacity to hold in excess of one thousand gallons of water and adaptable for slow mixing at approximately forty revolutions per minute. To avoid the formation of lumps and to substantially dissolve the ore, leonardite is added in the form of fine powder and mixed constantly for forty hours. The powder is ground to a screen size of perhaps 20 or finer. Flaked caustic soda which is ninety-nine percent pure is added to the water prior to the introduction of the leonardite and is agitated for about ten minutes. During the mixing step, the pH level of the mixture is monitored and maintained in the range of 6.5 to 8.0. The optimum level is pH 7. Water is added to the mixture to maintain the pH level at substantially pH 7. The mixture is agitated at ambient temperature for a minimum of forty hours. Due to temperature fluctuations, a longer mixing time may be required but it has been determined that at least forty hours of mixing is the minimum required to produce humic acid according to this invention. While various factors may modify the time required, this is the optimum time to complete mixing. Upon completion of the mixing cycle, a liquid end product is formed which is twenty-three percent humic acid in aqueous solution.

It is readily apparent that the humic acid concentrate of this invention can be formed by a relatively simple and inexpensive process using easily obtained and inexpensive equipment. The humic acid extract formed has been found to be highly beneficial to plant life and to result in relatively rapid stimulation of plant growth, color enhancement and seed germination with the addition of but a relatively small amount of the humic acid concentrate to the soil being treated. The humic acid of the invention has been proven to be compatible with most liquid fertilizers with the exception of calcium nitrate and, therefore, the humic acid of the invention may be mixed with liquid fertilizers prior to application. Additionally, the humic acid produced by the process of the invention may be used with dry fertilizers by applying it to the soil after the fertilizer is applied and then working both the dry fertilizer and humic acid into the soil. The humic acid may also be combined with the soaking water for those seeds that are soaked prior to planting such as rice, etc., or may be sprayed directly on the seed prior to planting or at the time of planting.

The following is an example for producing approximately six hundred forty gallons of humic acid concentrate according to the procedure of the invention. It is understood that this is an example for illustrative purposes only, and that more or less humic acid may be produced by varying the quantities of the water, leonardite and caustic soda used. Nine hundred twenty gallons of water are added to a large mixing tank measuring four feet high by nine feet in diameter. Then four hundred pounds of flake caustic soda is added to the water and agitated for about ten minutes. Then two thousand pounds of fine powder leonardite are added to the water and caustic soda. The mixture is agitated in the tank at forty revolutions per minute for forty hours. The product of the process from the above example is a twenty-three percent humic acid extract.

Obtaining humic acid by extracting the humic acid source with an aqueous solution of sodium hydroxide, commonly known as caustic soda, is known. Humates have, in the past, been dissolved in the extracting solution and separated from insoluble tailings. The extract has then been acidified and the humic acid precipitated from the solution. In the past, the maximum amount of humic acid dissolved in the extracting solution was about eight percent by weight in strongly caustic solutions. Large quantities of sodium hydroxide and water were necessary to recover humic acid in commercial operations. The process of the present invention overcomes the disadvantages of prior processes by producing a humic acid extract that is twenty-three percent by weight humic acid. This is compared with a maximum of about eight percent recovered by caustic extraction processes in the past. Additionally, the process of the present invention does not require heating or the addition of ammonia or the acidification of the extract.

While the foregoing is directed to the preferred embodiment of the present invention, other and further embodiments of the invention may be devised without departing from the basic concept thereof, and the scope thereof is determined by the claims which follow.

I claim:

1. The method of extracting humic acid from a source thereof, which comprises the steps of:
   (a) placing a quantity of water into a mixing tank;
   (b) adding a quantity of caustic soda to said water and mixing said soda with said water;
   (c) adding a quantity of humic acid bearing ore in the form of fine powder to said water and said caustic soda contained in said tank to obtain a mixture having a pH range of 6.5 to 8.0;
   (d) agitating said mixture for a time sufficient to substantially dissolve said ore in said mixture to obtain a liquid humic acid concentrate formed at ambient temperature; and
   (e) monitoring the pH of said mixture and adding water in an amount to maintain the pH of said mixture in the range of 6.5 to 8.0.

2. The method of claim 1 wherein said ore is leonardite.

3. The method of claim 2 wherein said time is at least forty hours.

4. The method of claim 3 further including the step of adding water to said mixture in said tank in an amount sufficient to bring the pH of said mixture to about pH 7.

5. The method of claim 4 further including the step of agitating said mixture at a rate of about forty revolutions per minute.

6. The method of claim 1 wherein said quantity of water is about nine hundred twenty gallons, said quantity of caustic soda is approximately four hundred pounds, said quantity of humic acid bearing ore is approximately two thousand pounds of powdered leonardite, and said time sufficient for said ore to be substantially dissolved in said mixture is at least forty hours.

* * * * *